United States Patent
Mallory et al.

(10) Patent No.: US 6,400,162 B1
(45) Date of Patent: Jun. 4, 2002

(54) CAPACITIVE DISPLACEMENT SENSOR FOR MEASURING THIN TARGETS

(75) Inventors: Roy E. Mallory, Bedford; Richard B. Carter, Marlborough, both of MA (US)

(73) Assignee: ADE Corporation, Westwood, MA (US)

(*) Notice: Subject to any disclaimer, the term of this patent is extended or adjusted under 35 U.S.C. 154(b) by 0 days.

(21) Appl. No.: 09/621,191

(22) Filed: Jul. 21, 2000

(51) Int. Cl.7 ............................................... G01R 27/26
(52) U.S. Cl. .......................................... 324/688; D10/80
(58) Field of Search ................... 324/688, 662, 324/689, 690, 687, 686; 73/514, 335, 304 C; D10/80

(56) References Cited

U.S. PATENT DOCUMENTS

| | | | | |
|---|---|---|---|---|
| 4,016,490 A | * | 4/1977 | Weckenmann et al. ..... | 324/671 |
| 5,537,109 A | * | 7/1996 | Dowd ......................... | 324/658 |
| 5,691,646 A | * | 11/1997 | Sasaki ........................ | 324/662 |
| 5,760,593 A | * | 6/1998 | Lawrence et al. .......... | 324/661 |

* cited by examiner

Primary Examiner—Safet Metjahic
Assistant Examiner—James Kerveros
(74) Attorney, Agent, or Firm—Weingarten, Schurgin, Gagnebin & Lebovici LLP

(57) ABSTRACT

A capacitive displacement sensor for measuring thin targets is presented. The plate of the measurement probe is designed to take into account the thin target shape and to provide accurate measurements of the thin target by reducing lateral movement sensitivity of the plate. The probe may also include a guard to reduce capacitive coupling of the plate with other structures which would affect the accuracy of the measurement.

11 Claims, 3 Drawing Sheets

CAPACITIVE DISPLACEMENT SENSOR FOR MEASURING THIN TARGETS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Capacitive displacement gages provide precise measurements of distance and/or distance change. Such gages employ a capacitive displacement sensor (henceforth called the probe) whose sensing area is typically placed parallel to the target to be measured. In most applications, the area of the target is much larger than that of the probe. There are, however, applications in which the target size may be small enough to be close to the size of the capacitive sensor. Such measurements are often difficult to make by using traditional capacitance gaging systems since the output of the gage becomes sensitive to the alignment between the probe and target. It would be desirable to have a capacitive displacement sensor for measuring thin targets which is generally insensitive to the alignment between the probe and the target.

BRIEF SUMMARY OF THE INVENTION

A capacitive displacement sensor for measuring thin targets is presented. The plate of the measurement probe of the sensor is designed to take into account the thin target shape and to provide accurate measurements of the thin target by reducing lateral movement sensitivity of the plate. The probe may also include a guard to reduce or eliminate capacitive coupling of the plate with other structures which would affect the accuracy of the measurement.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Capacitive displacement sensors provide displacement measurements without physically contacting the surface of the target being measured. The sensor typically includes a probe having a plate, the plate forming one plate of a capacitor. The other plate of the capacitor comprises the target whose displacement is being measured. The probe is brought into proximity with the surface being measured, thereby forming the capacitor. The distance from the probe to the target can be derived by measuring this capacitance because the relationship between distance and capacitance is known. For an ideal parallel-plate capacitor, capacitance and distance are related by the following formula:

$$C = \frac{\varepsilon_0 A}{d}$$

where:

C=the capacitance

=permittivity of air

A=area of the probe d=probe-to-target distance.

As defined by the formula, as the probe-to-target distance changes, there is a concomitant change in the capacitance C.

Problems occur when trying to measure the edge of a small target such as a spinning disk. Since the plate of the probe is typically larger than the target being measured, the output of the gage becomes sensitive to the alignment between the probe and target.

Figure 1:
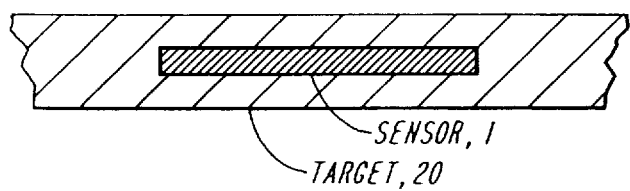
FIG. 1 is a diagram of a first prior art sensor and target.
Figure 2:
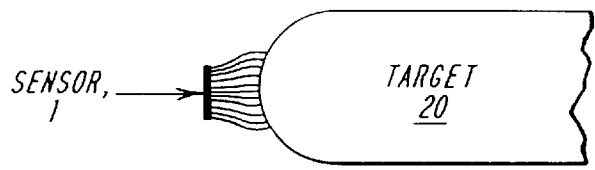
FIG. 2 is a side view of the prior art sensor and target of FIG. 1.

Referring now to FIGS. 1 and 2, a prior art approach to this problem was to shrink one dimension of the sensor 1 so that it becomes thinner than the target 20. FIGS. 1 and 2 show the shape of the sensor. The sensor 1 is made smaller in the vertical direction such that the sensor 1 is smaller than the target 20. Several possible measurement parameters cause this sensor 1 to operate with poor accuracy. For example when the probe is used to measure radial runout in the presence of axial runout; the probe should be insensitive to axial runout (which, as depicted in FIG. 1, would be target movement toward the top and bottom of the page, and will henceforth be referred to as lateral target movement). However, one problem is that the target's edge may not be flat and square, but may be chamfered or rounded, as shown in FIG. 2. This rounded edge effectively reduces the target area and makes the probe overly sensitive to lateral target motion. Additionally, the larger the radial runout to be measured, the further from the target the probe would have to stand, thereby further increasing the likelihood of sensitivity to lateral target movement.

This latter problem tends to make the situation scale dependent. That is, as the target gets thinner and thinner, the sensor can't be made infinitely thin and operated at an infinitesimally small probe-to-target spacing.

Figure 3:
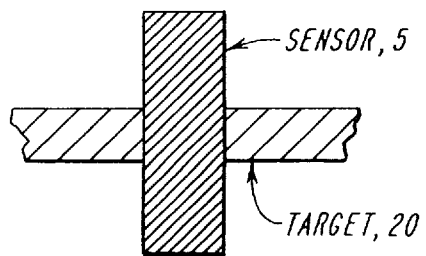
FIG. 3 is a diagram of a second prior art sensor and target.

Referring now to FIG. 3, another prior art attempt to overcome the problems associated with measuring surface displacement of thin targets was to make the sensor 5 much larger than the thickness of the target 20. If the sensor 5 is made long enough, then the probe will become insensitive to lateral target motion. However, it is impractical to make the sensor that long for several reasons. The sensor will capacitively couple to other structures that may be proximate to the target. Thus, the long sensor 5 introduces extraneous capacitances into the measured capacitances which affects the capacitance measurement and produces inaccurate distance measurements. Additionally, the output of the probe becomes more difficult to linearize.

Figure 4:
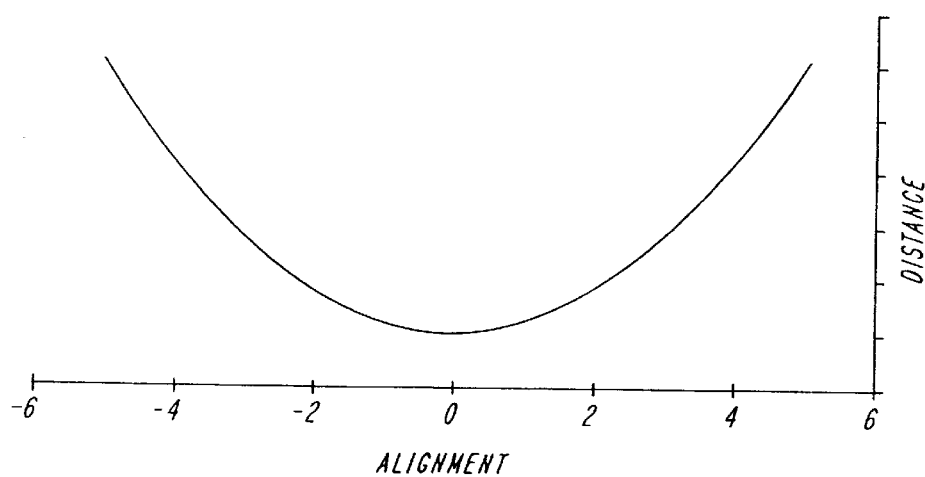
FIG. 4 is a graph showing the susceptibility of the prior art sensors to lateral movement sensitivity.
Figure 5:
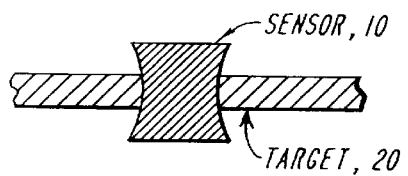
FIG. 5 is a diagram of the sensor of the present invention.

Referring now to FIG. 4, a graph showing the response curve of a standard long sensor 5 measuring a thin target is shown. The vertical axis of the graph represents the gage output and the horizontal axis is labeled in arbitrary distance units. The graph shows that as the probe moves laterally in either direction from being centered over the target, the apparent probe-to-target spacing increases. This curve may be flattened by appropriately shaping the sensor. The symmetry of the lateral motion sensitivity requires symmetry in the shape of the sensor. FIG. 5 below shows such a sensor 10. The plate of the sensor, instead of a standard rectangular shape, has been modified to include a non-linear shape. In this embodiment, the left and right edge of the plate are curved towards each other.

Figure 6:
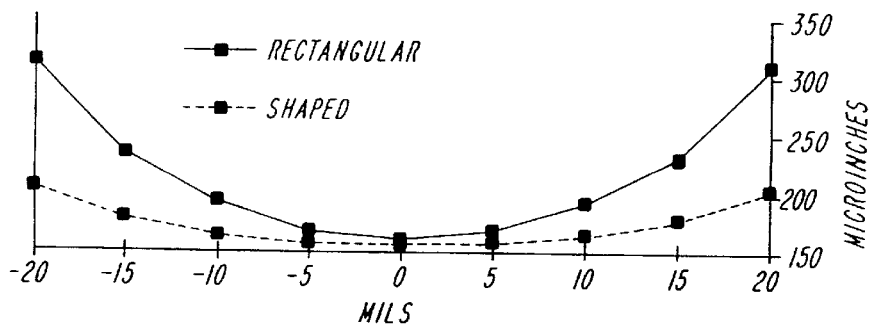
FIG. 6 is a graph showing the difference in lateral movement sensitivity between the present invention and the prior art sensor.

Referring now to FIG. 6, a graph is shown comparing the output curve of a traditional rectangular plate to the shaped plate of the present invention. The X axis of the graph indicates the distance between the center of the target and the center of the probe, and the Y axis shows the change in the gage output. As can be seen, the shaped sensor has much lower sensitivity to lateral motion than the standard rectangular sensor.

Figure 7A:
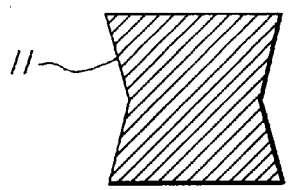
FIG. 7A is a view of a second sensor of the present invention.
Figure 7B:
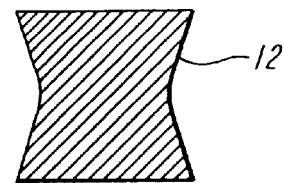
FIG. 7B is a view of a third sensor of the present invention.
Figure 8:
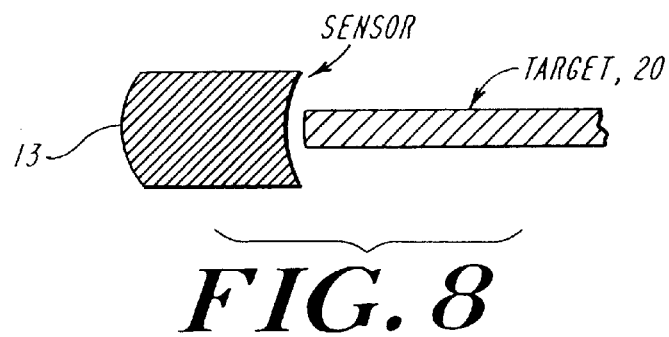
FIG. 8 is a view of a fourth embodiment of a sensor of the present invention.

Sensor shapes other than that shown in FIG. 5 can also be implemented to reduce lateral movement sensitivity. FIGS. 7A and 7B show examples of other sensor shapes 11 and 12. Reduction in lateral sensitivity can also be accomplished by using a rectangular sensor and then shaping the sensor's third dimension. FIG. 8 shows such a sensor 13. Other shapes not specifically defined here also can be used.

The sensors shown in FIGS. 5, 7A, 7B and 8 do not completely address the issue of capacitive coupling to structures other than that of the target to be measured. It is most common for capacitance displacement probes to have a driven guard that surrounds the sensing area. Such a guard is usually driven at a voltage that is approximately equal to the voltage on the sensor. It is the usual practice for the guard to be flush with the sensor.

Figure 9A:
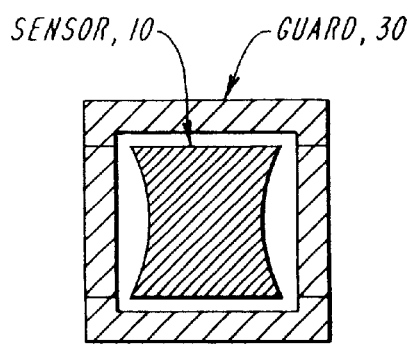
FIG. 9A is an end view of the sensor and guard of the present invention.
Figure 9B:
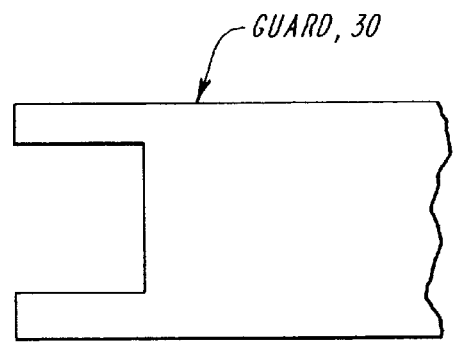
FIG. 9B is a side view of the guard of FIG. 9A.

Referring now to FIGS. 9A and 9B, a guard 30 is extended beyond the sensor 10 at its top and bottom, effectively forming a shield that blocks the sensor from capacitively coupling to structures close to the object being measured. The probe of FIG. 9 is capable of measuring the displacement of a thin target, typically some kind of disk-like or plate-like object while being substantially unaffected by lateral target motion and other structures that may be near the object being measured.

The present invention can thus measure thin targets by configuring the plate of the measurement probe to take into account the thin target shape and to provide accurate measurements of the thin target by reducing lateral movement sensitivity of the plate. The probe may also include a guard to reduce capacitive coupling of the plate with other structures which would affect the accuracy of the measurement. Accordingly, precise measurements can be made of thin targets without the problems associated with prior art probes.

Having described preferred embodiments of the present invention it should be apparent to those of ordinary skill in the art that other embodiments and variations of the presently disclosed embodiment incorporating these concepts may be implemented without departing from the inventive concepts herein disclosed. Accordingly, the invention should not be viewed as limited to the described embodiments but rather should be limited solely by the scope and spirit of the appended claims.

We claim:

1. A sensor for measuring thin targets comprising:
   a plate having a front surface and a rear surface, the edges of said front and rear surfaces defined by a top edge, a bottom edge, a first side edge and a second side edge, wherein said top edge and said bottom edge are linear, approximately the same length and generally parallel to each other, said first side edge and said second side edge are concave and symmetric about an axis perpendicular to said top and bottom edges, and said front and rear surfaces extend laterally beyond the thickness of said thin target.

2. The sensor of claim 1 wherein said plate first side edge and said plate second side edge are non-linear.

3. The sensor of claim 2 wherein said plate first side edge and said second side edge are curved toward a center of said plate.

4. The sensor of claim 2 wherein said first side edge and said second side edge include a first linear portion and a second linear portion, said first linear portion angled with respect to said second linear portion.

5. The sensor of claim 1 further comprising a guard, said guard disposed above said top edge and below said bottom edge of said plate, said guard having a first portion above said top edge extending beyond said front surface of said plate.

6. The sensor of claim 5 wherein said guard includes a second portion extending beyond said front surface below said bottom edge of said plate.

7. A sensor for measuring thin targets comprising:
   a plate having a front surface, a rear surface, a top edge, a bottom edge, a first side edge and a second side edge, and wherein said front surface and said rear surface are curved and are coaxial with respect to each other.

8. The sensor of claim 7 wherein said top edge and said bottom edge are linear, approximately the same length and are generally parallel with each other.

9. The sensor of claim 7 wherein said first side edge and said second side edge are curved along a common longitudinal axis.

10. The sensor of claim 7 further comprising a guard, said guard disposed above said top edge and below said bottom edge of said plate, said guard having a first portion extending above said top edge beyond said front surface of said plate.

11. The sensor of claim 10 wherein said guard includes a second portion extending below said bottom edge beyond said front surface of said plate.

* * * * *